(12) United States Patent
Hur et al.

(10) Patent No.: US 7,974,026 B2
(45) Date of Patent: Jul. 5, 2011

(54) LENS MOVING DEVICE AND INSTALLATION UNIT

(75) Inventors: Dong-sung Hur, Suwon-si (KR); Hyun-jin Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/533,128

(22) Filed: Jul. 31, 2009

(65) Prior Publication Data

US 2010/0027141 A1 Feb. 4, 2010

(30) Foreign Application Priority Data

Aug. 1, 2008 (KR) .................. 10-2008-0075579

(51) Int. Cl.
*G02B 7/02* (2006.01)
(52) U.S. Cl. .................. 359/824; 359/819; 359/811

(58) Field of Classification Search .......... 359/694–701, 359/811–824, 826, 829; 396/72–79, 137, 396/139
See application file for complete search history.

(56) References Cited

U.S. PATENT DOCUMENTS

| 4,671,524 | A  | * | 6/1987  | Haubenwallner | 280/212 |
|-----------|----|---|---------|---------------|---------|
| 5,926,656 | A  | * | 7/1999  | Imura et al.  | 396/55  |
| 6,825,991 | B2 | * | 11/2004 | Takanashi et al. | 359/696 |
| 7,280,292 | B2 | * | 10/2007 | Akiba et al.  | 359/819 |
| 7,289,725 | B2 | * | 10/2007 | Nomura        | 396/73  |
| 7,511,900 | B2 | * | 3/2009  | Imagawa et al. | 359/813 |

* cited by examiner

*Primary Examiner* — Mohammed Hasan
(74) *Attorney, Agent, or Firm* — Drinker Biddle & Reath LLP

(57) ABSTRACT

Disclosed is a lens moving device and a lens installation unit within which at least one lens is installed and at least one guiding protrusion is formed, a driving means that moves the lens installation unit, and a frame which includes a guiding slot into which the guiding protrusion is arranged and houses the lens installation unit.

14 Claims, 6 Drawing Sheets

LENS MOVING DEVICE AND INSTALLATION UNIT

CROSS-REFERENCE TO RELATED PATENT APPLICATION

This application claims the benefit of Korean Patent Application No. 10-2008-0075579, filed on Aug. 1, 2008, in the Korean Intellectual Property Office, the disclosure of which is incorporated herein in its entirety by reference.

BACKGROUND OF THE INVENTION

1. Field of the Invention

The present invention relates to a lens moving device, and more particularly, to a lens moving device which can be used in image capturing devices, such as cameras and camcorders.

2. Description of the Related Art

Image capturing devices, such as cameras and camcorders, may perform focusing operations and/or zooming operations. To perform these operations, a lens must be moved. Therefore, a device for moving a lens along the optical axis is required.

A conventional lens moving device includes a lens frame into which lens is arranged, guidance means to guide movement of the lens frame, and movement means for moving the lens in the optical direction. There are various lens moving devices developed according to the structure and type of image capturing device to which the lens moving device is adapted.

In particular, lens moving devices, which occupy a small amount of space within mobile image capturing devices and can be operated stably, are being developed due to the recent popularization of small sized mobile image capturing devices such as digital cameras.

SUMMARY OF THE INVENTION

The present invention provides in one embodiment a lens moving device including a lens installation unit, a driving means movably connected to the lens installation unit, and a frame. The lens installation unit comprises at least one lens and at least one guiding protrusion. The frame comprises a guiding slot into which the guiding protrusion is arranged and houses the lens installation unit.

At least one guiding hole may be formed on the lens installation unit, and a guiding bar may be attached to the frame. The guiding hole and bar may thereby be used to guide movement of the lens installation unit.

In various embodiments, the driving means comprises a lead screw and a driving motor capable of rotating the lead screw. In such embodiments, the lens installation unit further comprises a screw unit for engagement with the lead screw. Optionally, the screw unit may comprise a hinge pin and an elastic component in addition to a screw.

In yet another embodiment, the present invention provides a lens installation unit including a lens installation portion adapted for holding a lens, a guiding protrusion, and a guiding hole. In such embodiments, the guiding protrusion extends away from the lens installation portion in one direction, and the guiding hole extends in another direction away from the lens installation portion. The lens installation portion of such embodiments may further comprise the variations of the embodiments of the lens moving device described above.

In still other embodiments, the present invention provides a functional means for holding a lens, moving the means for holding, and guiding the means for holding while the means for moving operates. These functional means are provided by the structures disclosed herein.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining preferred embodiments of the invention with reference to the attached drawings.

Figure 1:
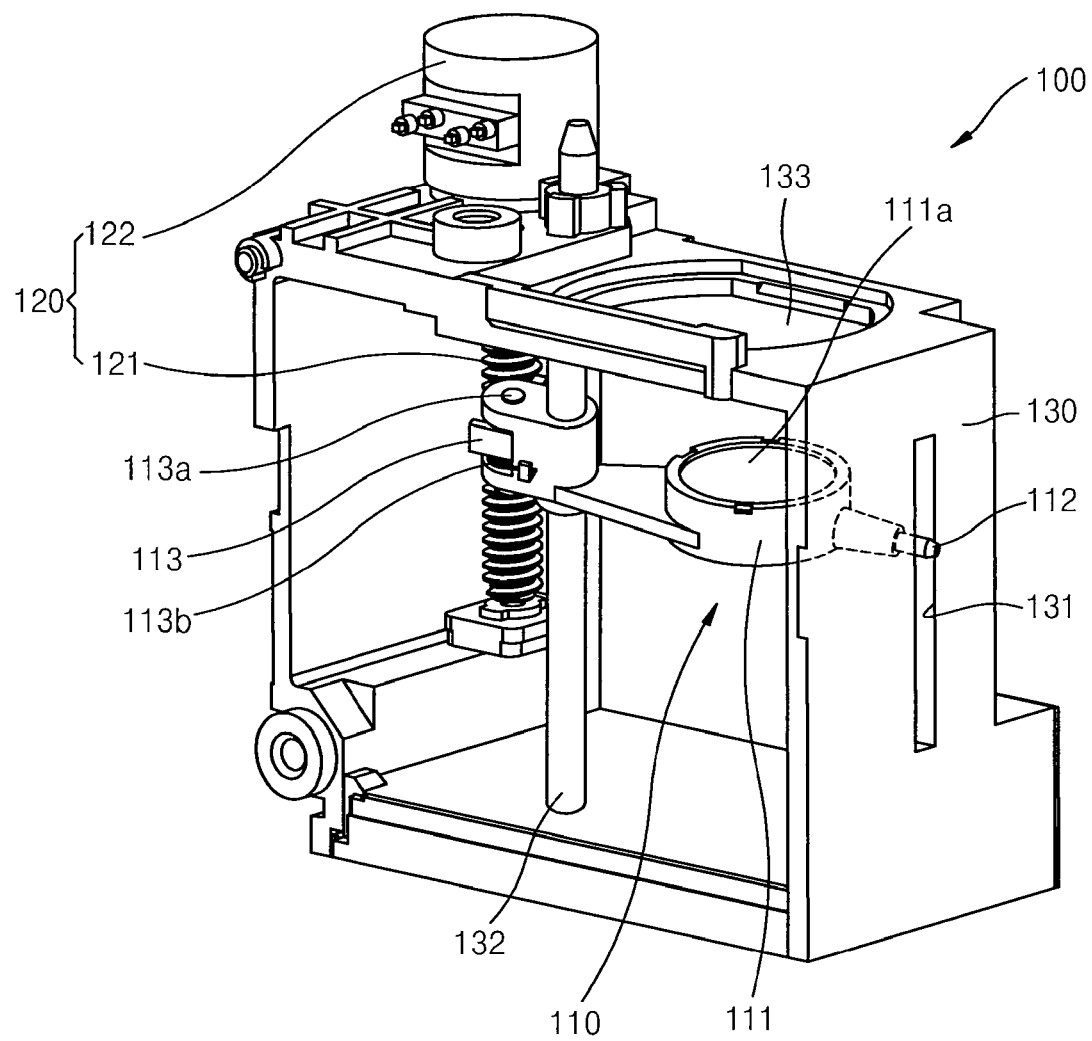
FIG. 1 is a perspective view of a lens moving device according to an embodiment of the present invention.
Figure 2:
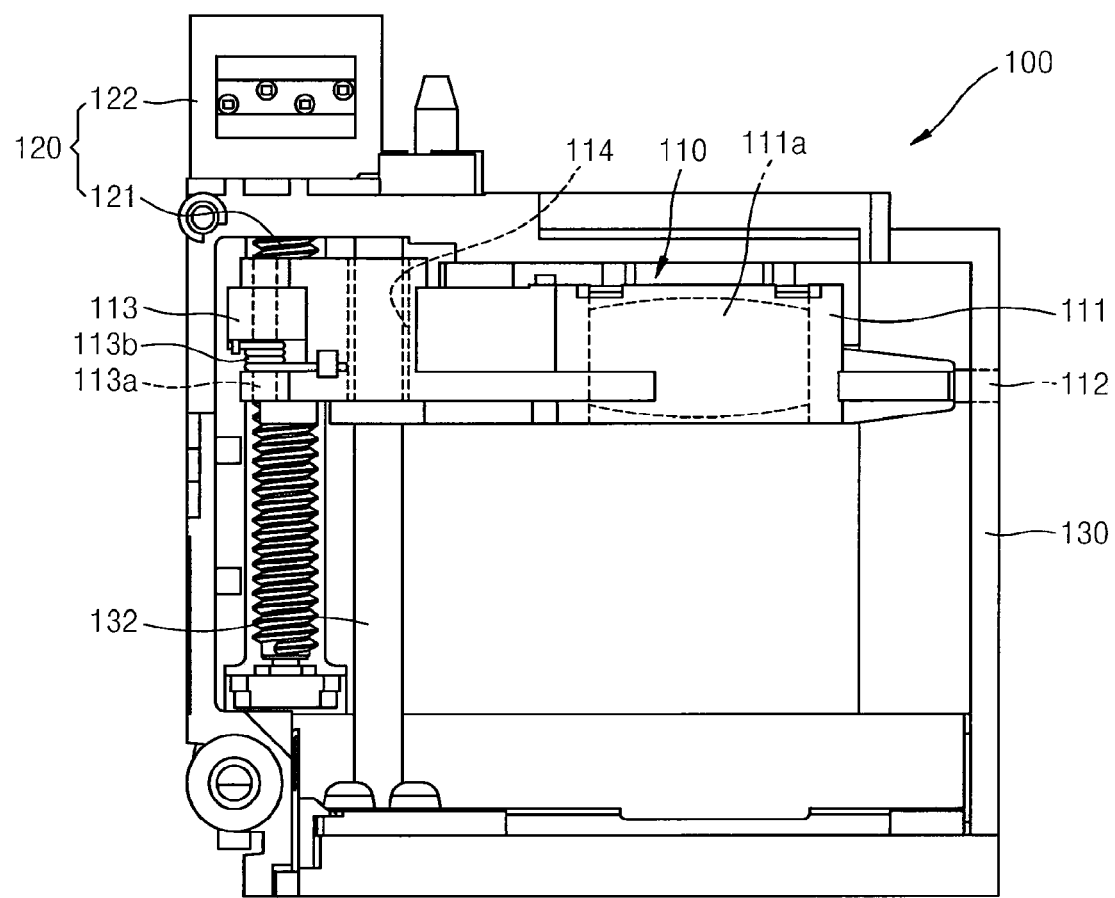
FIG. 2 is a front view of the lens moving device of FIG. 1.
Figure 3:
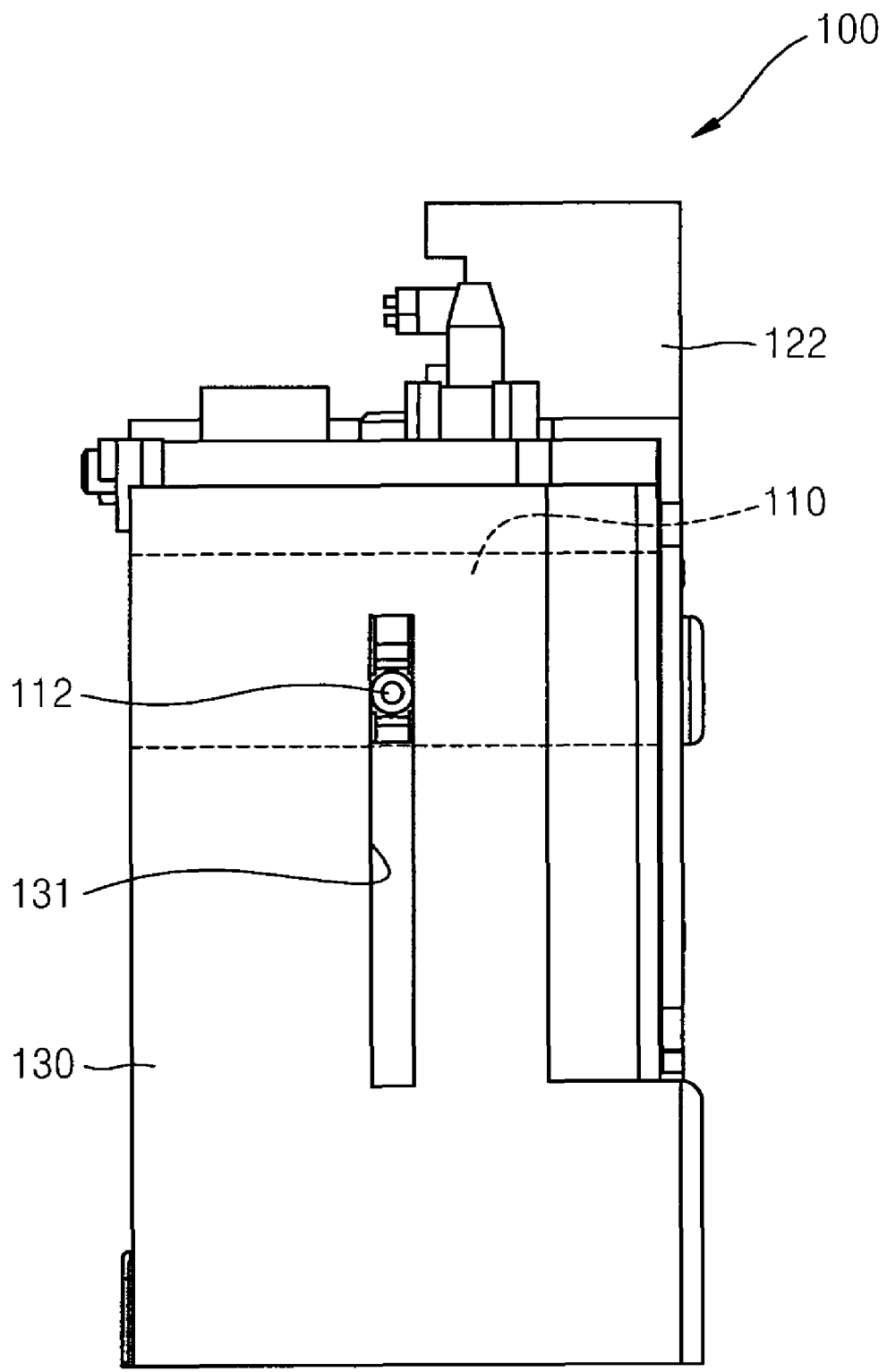
FIG. 3 is a right view of the lens moving device of FIG. 1.
Figure 4:
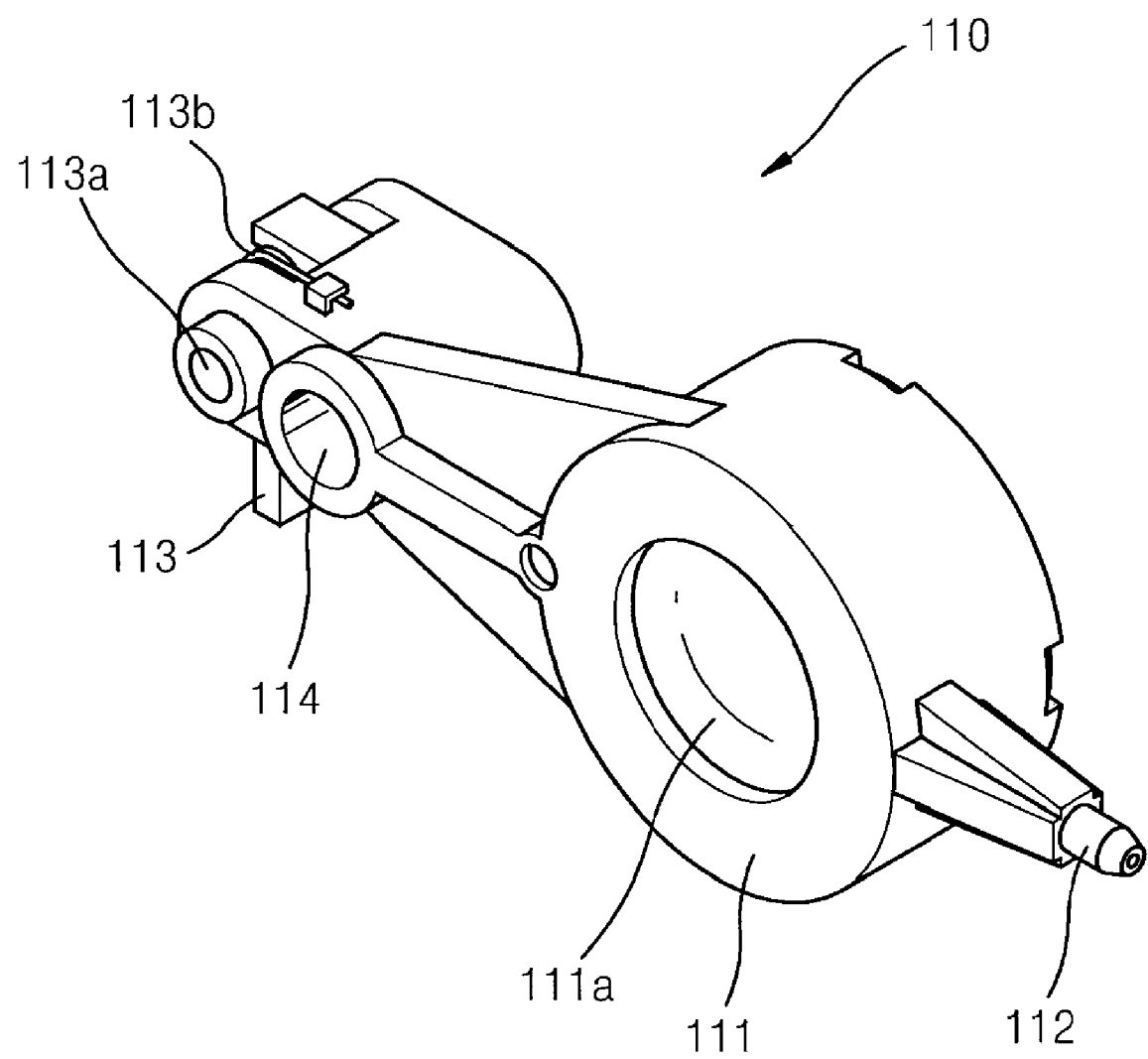
FIG. 4 is a perspective view of a lens installation unit of FIG. 1.
Figure 5:
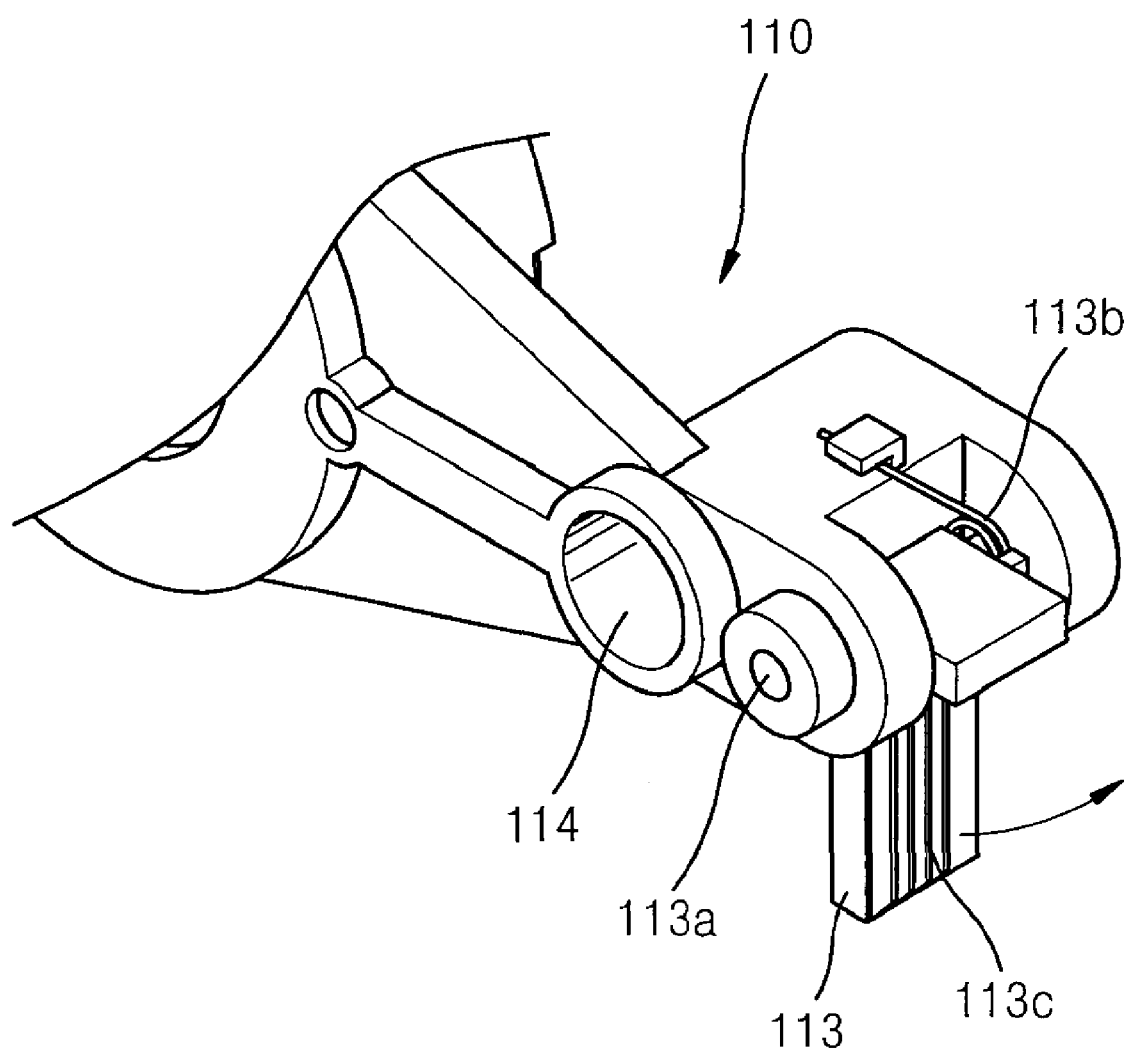
FIG. 5 is a magnified view of a screw unit of the lens installation unit of FIG. 1.

FIG. 1 is a perspective view of a lens moving device according to an embodiment of the present invention. Furthermore, FIG. 2 is a front view of the lens moving device of FIG. 1, FIG. 3 is a right view of the lens moving device of FIG. 1, FIG. 4 is a perspective view of a lens installation unit of FIG. 1, and FIG. 5 is a magnified view of a screw unit of the lens installation unit of FIG. 1.

Referring to FIGS. 1 through 5, the lens moving device 100 according to the current embodiment is installed inside a camera, and includes the lens installation unit 110, driving means 120, and a frame 130.

Although the lens moving device 100 according to the current embodiment is installed inside a camera, the present invention is not limited thereto. That is, the lens moving device 100 according to the present invention can be applied to any device requiring a movable lens, for example devices such as camcorders, projectors, built-in cameras for cellular phones, etc.

The lens installation unit 110 includes a lens installation portion 111, a guiding protrusion 112, and a screw portion 113.

A lens 111a is attached to the lens installation portion 111.

The lens 111a transmits imaging light. Here, a central axis penetrating the lens 111a at a perpendicular is referred as the optical axis.

According to the current embodiment, only one lens 111a is used. However, the present invention is not limited thereto. In other words, any number of lenses may be installed to the lens installation portion 111. For example, two or more lenses may be installed to the lens installation portion 111.

According to the current embodiment, the lens 111a is fixed to the lens installation portion 111 by using an adhesive. However, the present invention is not limited thereto. In other words, the lens 111a according to the present invention may be attached to the lens installation portion 111 by using a fixing mask.

The guiding protrusion 112 is disposed at an end of the lens installation unit 110 and guides movement of the lens installation unit 110.

The guiding protrusion 112 is arranged in a guiding slot 131 of the frame 130 and slides back and forth. Thus, the guiding protrusion 112 is formed such that the diameter thereof is smaller than the width of the guiding slot 131.

According to the current embodiment, a single guiding protrusion 112 is disposed on the lens installation unit 110. However, the present invention is not limited thereto. In other words, according to the present invention, a plurality of guiding protrusions may be disposed on the lens installation unit 110. In this case, number of the guide slots 131 formed on the frame 130 may correspond to the number of guiding protrusions.

The screw portion 113 is disposed on the other end of the lens installation unit 110 with respect to the lens installation portion 111 and directly facilitates movement of the lens installation unit 110. The screw portion 113 is installed to the lens installation unit 110 by using a hinge pin 113a and an elastic component 113b.

As shown in FIG. 5, a screw 113c is formed on the screw portion 113. When a lead screw 121 rotates while the screw 113c and the lead screw 121 of the driving means 120 are engaged with each other, the screw portion 113 and the lens installation unit 110 move.

Here, the elastic component 113b is installed to receive predetermined elastic pressure such that the screw of the lead screw 121 and the screw 113c of the screw portion 113 always contact each other even when the lens installation unit 110 is moving or stopped. Here, the elastic component 113b may be a torsional coil spring.

Meanwhile, a guiding hole 114 is formed on the lens installation unit 110. The guiding hole 114 guides movement of the lens installation unit 110 along the guiding bar 132.

In other words, since a guiding bar 132 of the frame 130 is positioned through the guiding hole 114, the lens installation unit 110 can slide along the guiding bar 132.

The guiding hole 114 is formed to have a circular shape and an inner diameter of the guiding hole 114 greater than the diameter of the guiding bar 132.

The guiding hole 114 is formed at a position having a similar distance from the center of the lens installation portion 111 as the position at which the guiding protrusion 112 is formed but on the opposite side thereof, that is, a position close to the screw portion 113. Thus, the guiding hole 114 can perform balanced guidance of movement of the lens installation unit 110.

Although the shape of the guiding hole 114 is circular according to the current embodiment, the present invention is not limited thereto. In other words, a guide hole according to the present invention may have any shape. For example, a guide hole may be formed to have a shape such as a rectangle and other polygonal shapes. In this case, the guiding bar 132 may be formed to have an adequate cross-sectional shape corresponding to the shape of the guiding hole 114.

Meanwhile, the driving means 120 moves the lens installation unit 110, and includes the lead screw 121 and a driving motor 122.

The lead screw 121 is formed to engage with the screw 113c of the screw portion 113. As described above, if the lead screw 121 rotates, the screw portion 113 moves. Thus, the lens installation unit 110 also moves.

The driving motor 122 is installed to the frame 130 and supplies driving power to revolve the lead screw 121. The lead screw 121 is installed to the axis of the driving motor 122.

According to the current embodiment, there is no decelerating means disposed between the axis of the driving motor 122 and the lead screw 121, but the present invention is not limited thereto. In other words, a decelerating means may be disposed between the axis of the driving motor 122 and the lead screw 121 to control rotating speed of the lead screw 121.

The driving motor 122 is controlled by a motor drive unit and a control unit disposed outside the lens moving device 100. Here, the motor drive unit and the control unit may have configurations in the prior art. Thus, descriptions thereof will be omitted here.

Meanwhile, the frame 130 has the shape of a rectangular parallelepiped box, is configured to house the lens installation unit 110, provide overall support to the lens moving device 100, and functions as a lens housing.

The guiding slot 131 is formed on a side surface of the frame 130. The guiding bar 132 is disposed within the frame 130, and an opening 133 through which imaging light is transmitted is formed on top of the frame 130.

The guiding slot 131 is an elongate hole formed in a direction in which the lens installation unit 110 moves. The length of the guiding slot 131 is the distance the lens installation unit 110 is required to move.

The guiding protrusion 112 is arranged in the guiding slot 131 to slide back and forth, and thus the guiding slot 131 guides movement of the lens installation unit 110.

The guiding bar 132 is an elongate rod with a circular cross-section, and both ends of the guiding bar 132 are fixed to the frame 130.

The guiding bar 132 is arranged through the guiding hole 114 such that the lens installation unit 110 can slide back and forth along the guiding bar 132. Thus, the guiding bar 132 also guides movement of the lens installation unit 110.

Although the cross-section of the guiding bar is circular in the current embodiment, the present invention is not limited thereto. In other words, a guiding bar according to the present invention may have cross-section of any shape. In other words, the shape of the cross-section of the guiding bar is only required to match the shape of the guiding hole. For example, if the shape of a guiding hole is a rectangle, the shape of cross-section of the guiding bar may also be a rectangle. Similarly, the shape of cross-section of the guiding bar may be a polygon or an ellipse to correspond to the shape of the guiding hole.

Hereinafter, referring to FIG. 6, operations of the lens moving device 100 according to the current embodiment will be described.

Figure 6:
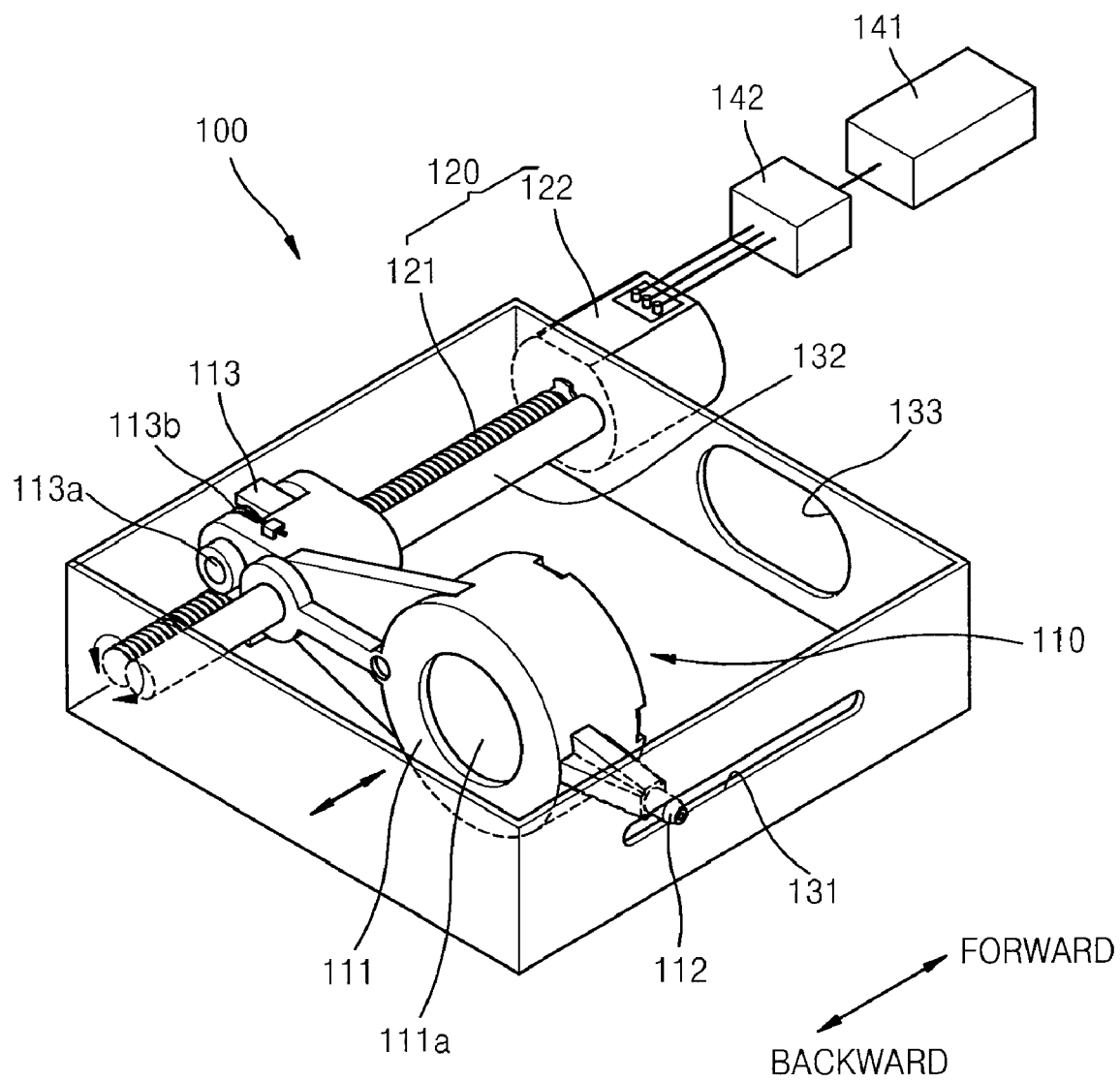
FIG. 6 is a perspective view for generally showing operations of the lens moving device, according to an embodiment of the present invention.

FIG. 6 is a perspective view for generally showing operations of the lens moving device 100.

When a user operates the driving motor 122 by using a control unit 141 and a motor drive 142, the driving motor 122 rotates the lead screw 121.

When the lead screw 121 rotates, the screw portion 113 contacting the screw of the lead screw 121 moves along with the lead screw 121. Thus, the lens installation unit 110 moves forward or backward.

When the lens installation unit 110 moves, the guiding protrusion 112 arranged in the guiding slot 131 slides back and forth to guide movement of the lens installation unit 110. Furthermore, the guiding bar 132 arranged in the guiding hole 114 slides back and forth to guide movement of the lens installation unit 110. Accordingly, the lens installation unit 110 can move stably due to having two guides.

In the current embodiment, the configuration in which the guiding protrusion 112 is arranged in the guiding slot 131 is simple as compared to a configuration using guiding hole and guiding bar. Thus, number of parts and assembly steps can be reduced. Furthermore, the configuration only requires small space for installation, and thus space within the frame 130 can be used efficiently.

As describe above, the lens installation unit 110 can be moved stably by using a simple configuration using the guiding protrusion 112 and the guiding slot 131 to guide movement of the lens installation unit 110.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens moving device, comprising:
   a lens installation unit including at least one lens and at least one guiding protrusion;
   a driving means for moving the lens installation unit; and
   a frame including a guiding slot through which the guiding protrusion extends and within which the lens installation unit is housed,
   wherein the lens installation unit comprises a screw unit which is adapted for engagement with the driving means and includes an elastic component and a screw, and
   wherein at least one guiding hole is formed in the lens installation unit for movable connection to the frame.

2. The lens moving device of claim 1, further comprising a guiding bar attached to the frame and to which the guiding hole is movably connected.

3. The lens moving device of claim 1, wherein the driving means includes a lead screw and a driving motor capable of rotating the lead screw, and the screw unit is adapted for engagement with the lead screw.

4. The lens moving device of claim 1, wherein the screw unit is adapted for engagement with the driving means.

5. The lens moving device of claim 1, wherein the screw unit is adapted for engagement with the driving means, and the screw unit further includes a hinge pin.

6. A lens installation unit, comprising:
   a lens installation portion adapted for holding a lens;
   a guiding protrusion extending in a first direction away from the lens installation portion; and
   a guiding hole extending in a second direction away from the lens installation portion,
   wherein the lens installation portion comprises a screw unit which includes a screw portion and an elastic component and is engageable with a mechanism for driving the lens installation portion, and
   wherein at least one guiding hole is formed for movable connection to a frame of the lens installation portion.

7. The lens installation unit of claim 6, wherein the screw unit extends away from the lens installation portion.

8. The lens installation unit of claim 7, further comprising the driving mechanism including a lead screw and a driving motor, wherein the lead screw is movably connected to the screw unit.

9. The lens installation unit of claim 6, wherein the screw unit extends away from the lens installation portion, the screw unit further comprising a hinge pin.

10. The lens installation unit of claim 6, wherein the guiding hole is movably connected to a guiding bar that extends in a direction substantially parallel to an optical axis.

11. A lens moving device, comprising:
    a means for holding a lens including a screw unit comprising a screw portion and an elastic component;
    a means for moving the means for holding a lens adapted for engagement with the screw unit; and
    a means for guiding the means for holding the lens as the means for moving operates including a guiding hole in the means for holding a lens.

12. The lens moving device of claim 11, wherein the means for holding the lens comprises a lens installation unit to which at least one lens is installed and at least one guiding protrusion is formed.

13. The lens moving device of claim 11, wherein the means for moving the means for holding a lens comprises a driving motor and a lead screw, wherein the driving motor is adapted for rotating the lead screw.

14. The lens moving device of claim 11, wherein the means for guiding comprises a guiding protrusion extending away from the means for holding.

* * * * *